(12) United States Patent
Zeng et al.

(10) Patent No.: US 9,898,976 B2
(45) Date of Patent: Feb. 20, 2018

(54) COLOR SHIFT COMPENSATION METHOD AND DEVICE

(71) Applicant: Shenzhen China Star Optoelectronics Technology Co., Ltd., Shenzhen, Guangdong (CN)

(72) Inventors: Dekang Zeng, Guangdong (CN); Yu-Yeh Chen, Guangdong (CN); Dongsheng Guo, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 126 days.

(21) Appl. No.: 14/778,318

(22) PCT Filed: Apr. 22, 2015

(86) PCT No.: PCT/CN2015/077140
§ 371 (c)(1),
(2) Date: Sep. 18, 2015

(87) PCT Pub. No.: WO2016/155049
PCT Pub. Date: Oct. 6, 2016

(65) Prior Publication Data
US 2016/0293121 A1    Oct. 6, 2016

(30) Foreign Application Priority Data
Apr. 1, 2015    (CN) .......................... 2015 1 0153123

(51) Int. Cl.
G02F 1/13    (2006.01)
G09G 3/36    (2006.01)
(Continued)

(52) U.S. Cl.
CPC ......... *G09G 3/3607* (2013.01); *G09G 3/3611* (2013.01); *G09G 3/3648* (2013.01);
(Continued)

(58) Field of Classification Search
CPC ......... G09G 3/3607; G09G 2300/0491; G09G 2320/0252; G09G 2320/0242;
(Continued)

(56) References Cited

U.S. PATENT DOCUMENTS 6,396,505 B1 *    5/2002    Lui ................... G02F 1/133514
345/589
2002/0149598 A1 *    10/2002    Greier .................. G09G 3/3611
345/589
(Continued)

*Primary Examiner* — Michael J Eurice
(74) *Attorney, Agent, or Firm* — Andrew C. Cheng

(57) ABSTRACT

The color shift compensation method comprises: receiving target input gray scale data of a target sub pixel dot in a present line, and acquiring previous output gray scale data of a sub pixel dot of the previous line in the same display data line of the target sub pixel dot, and then, implementing digital to analog conversion to the target output gray scale data of the target sub pixel dot simultaneously corresponding to the target input gray scale data and the previous output gray scale data with combination of the target relationship table to acquire the target voltage of the target sub pixel dot, and ultimately, adjusting a color displayed by a target pixel where the target sub pixel dot is. With the present invention, the color shift issue due to the resistance difference of the fan section can be solved to promote the display effect.

3 Claims, 3 Drawing Sheets

(51) Int. Cl.
  *G06T 5/00*   (2006.01)
  *H04N 9/64*   (2006.01)
  *H04N 1/46*   (2006.01)
  *H04N 1/40*   (2006.01)
  *H04N 1/60*   (2006.01)

(52) U.S. Cl.
  CPC ............... *G09G 2300/0491* (2013.01); *G09G 2320/0223* (2013.01); *G09G 2320/0242* (2013.01); *G09G 2320/0252* (2013.01); *G09G 2320/0285* (2013.01); *G09G 2320/0666* (2013.01); *G09G 2340/06* (2013.01); *H04N 1/40012* (2013.01); *H04N 1/465* (2013.01); *H04N 1/60* (2013.01); *H04N 9/643* (2013.01); *H04N 9/646* (2013.01)

(58) Field of Classification Search
  CPC ....... G09G 2320/0666; G09G 2340/06; H04N 1/465; H04N 1/40012; H04N 1/60; H04N 9/643; H04N 9/646
  See application file for complete search history.

(56) References Cited

U.S. PATENT DOCUMENTS

| | | | | |
|---|---|---|---|---|
| 2002/0186230 A1* | 12/2002 | Kudo | ................... | G09G 3/3607 345/690 |
| 2003/0035078 A1* | 2/2003 | Maruyama | ........ | G02F 1/133634 349/117 |
| 2003/0085906 A1* | 5/2003 | Elliott | ..................... | G09G 3/20 345/613 |
| 2003/0218591 A1* | 11/2003 | Shen | ..................... | G09G 3/3696 345/89 |
| 2006/0145978 A1* | 7/2006 | Takatori | ................ | G09G 3/2014 345/87 |
| 2007/0279372 A1* | 12/2007 | Brown Elliott | ...... | G09G 3/3426 345/102 |
| 2007/0291048 A1* | 12/2007 | Kerofsky | ............. | G09G 3/3406 345/589 |
| 2008/0094426 A1* | 4/2008 | Kimpe | ..................... | G09G 3/20 345/691 |
| 2010/0060837 A1* | 3/2010 | Wang | ................ | G02F 1/133707 349/123 |
| 2010/0091032 A1* | 4/2010 | Ueki | .................... | G09G 3/2003 345/590 |
| 2010/0156774 A1* | 6/2010 | Broughton | ........... | G09G 3/2018 345/88 |
| 2011/0063330 A1* | 3/2011 | Bae | ...................... | G09G 3/3413 345/690 |
| 2011/0128483 A1* | 6/2011 | Park | ...................... | G02B 3/005 349/112 |
| 2011/0175925 A1* | 7/2011 | Kane | ........................ | G01J 1/42 345/589 |
| 2012/0113379 A1* | 5/2012 | Tomizawa | ........... | G09G 3/3607 349/187 |
| 2013/0135272 A1* | 5/2013 | Park | ...................... | G09G 3/3233 345/211 |
| 2016/0155415 A1* | 6/2016 | Chen | ........................ | G09G 5/02 345/589 |
| 2016/0260401 A1* | 9/2016 | Sakaigawa | ........... | G09G 3/3607 |

* cited by examiner

COLOR SHIFT COMPENSATION METHOD AND DEVICE

CROSS REFERENCE

This application claims the priority of Chinese Patent Application No. 201510153123.3, entitled "Color shift compensation method and device", filed on Apr. 1, 2015, the disclosure of which is incorporated herein by reference in its entirety.

FIELD OF THE INVENTION

The present invention relates to a display technology field, and more particularly to a color shift compensation method and a device.

BACKGROUND OF THE INVENTION

The Liquid Crystal Display (LCD) is the common display device. The yield of the production is high. The cost is relatively low and the acceptance is high in the market. A common display is the Thin at present is the Thin Film transistors (TFT) liquid crystal display.

As the designing the pixel display matrix for the TFT-LCD, the wiring layout concentration process is needed for the lamination area of the driving integrated circuit, and then for outputting to the respective display lines. Because the distances of the respective display lines from the driving integrated circuit are different, the distance from the driving integrated circuit to the two sides of the fan area is larger, and the distance from the driving integrated circuit to the middle of the fan area is smaller. Therefore, the resistance of the two sides of the fan area is larger, and the resistance of the middle is smaller. If the sub pixel dots of the respective display lines are charged at the same time, the voltage at the two sides of the display lines will be seriously delayed than the voltage of the middle. The charge periods of the respective display lines are not consistent. Once the charge period of the sub pixel dot of the display line is insufficient, the voltage hold by the sub pixel dot cannot reach the ideal voltage level. The brightness of the R(red), G(green) or B(blue) of the primary colors displayed by the pixel dot where the sub pixel dot is will bias darker as displaying. During the color mixing image display procedure of liquid crystal display panel, the serious color shift issue will happen to the two sides which show bias red, bias blue or bias green. Reducing the color shift issue as displaying is now pretty much the agenda for the liquid crystal display.

SUMMARY OF THE INVENTION

The embodiment of the present invention discloses a color shift compensation method and a device, capable of solving the color shift issue when the liquid crystal panel performs display to promote the display effect.

The embodiment of the present invention discloses a color shift compensation method, applied in a liquid crystal display panel, wherein the liquid crystal display panel is divided into a plurality of display areas, and each display area comprises a plurality of display lines aligned in row, and each display line comprises a plurality of pixel dots aligned in column, and each pixel dot comprises at least three sub pixel dots aligned in row, wherein:

receiving target input gray scale data of a target sub pixel dot in a present line, and acquiring previous output gray scale data of a sub pixel dot of the previous line in the same display data line of the target sub pixel dot;

querying target output gray scale data of the target sub pixel dot simultaneously corresponding to the target input gray scale data and the previous output gray scale data with combination of a target relationship table according to the target input gray scale data and the previous output gray scale data, wherein the target relationship table comprises corresponding relationships of input gray scale data of sub pixel dot of any row, output gray scale data of sub pixel dot of last row of the sub pixel dot of any row and output gray scale data of sub pixel dot of any row;

implementing digital to analog conversion to the target output gray scale data to acquire a target voltage of the target sub pixel dot;

adjusting a color displayed by a target pixel where the target sub pixel dot is according to the target voltage.

Correspondingly, the embodiment of the present invention discloses a color shift compensation device, applied in a liquid crystal display panel, wherein the liquid crystal display panel is divided into a plurality of display areas, and each display area comprises a plurality of display lines aligned in row, and each display line comprises a plurality of pixel dots aligned in column, and each pixel dot comprises at least three sub pixel dots aligned in row, wherein:

an acquiring unit, receiving target input gray scale data of a target sub pixel dot in a present line, and acquiring previous output gray scale data of a sub pixel dot of the previous line in the same display data line of the target sub pixel dot;

a querying unit, querying target output gray scale data of the target sub pixel dot simultaneously corresponding to the target input gray scale data and the previous output gray scale data with combination of a target relationship table according to the target input gray scale data and the previous output gray scale data acquired by the acquiring unit, wherein the target relationship table comprises corresponding relationships of input gray scale data of sub pixel dot of any row, output gray scale data of sub pixel dot of last row of the sub pixel dot of any row and output gray scale data of sub pixel dot of any row;

a digital to analog conversion unit, implementing digital to analog conversion to the target output gray scale data queried by the querying unit to acquire a target voltage of the target sub pixel dot;

an adjusting unit, adjusting a color displayed by a target pixel where the target sub pixel dot is according to the target voltage acquired by the digital to analog conversion unit.

With implementing the embodiments of the present invention, the benefits are:

In the embodiments of the present invention, the liquid crystal display panel is divided into a plurality of display areas, and each display area comprises a plurality of display lines aligned in row, and each display line comprises a plurality of pixel dots aligned in column, and each pixel dot comprises at least three sub pixel dots aligned in row. Therefore, as receiving target input gray scale data of a target sub pixel dot in a present line, the color shift compensation device acquires previous output gray scale data of a sub pixel dot of the previous line in the same display data line of the target sub pixel dot, and then, querying the target output gray scale data of the target sub pixel dot simultaneously corresponding to the target input gray scale data and the previous output gray scale data with combination of the target relationship table according to the target input gray scale data and the previous output gray scale data, and implementing digital to analog conversion to the target output gray scale data to acquire the target voltage of the target sub pixel dot, and ultimately, adjusting a color displayed by a target pixel corresponded with the target sub pixel dot according to the target voltage. With the embodiment of the present invention, the original voltage which should be applied to the target sub pixel can be adjusted to the voltage corresponding to the target output data for changing the color displayed by the target pixel where the target sub pixel dot is and accordingly, the color shift issue of the panel due to the impedance difference in the fan section can be solved to promote the display effect.

BRIEF DESCRIPTION OF THE DRAWINGS

In order to more clearly illustrate the embodiments of the present invention, the following figures will be described in the embodiments are briefly introduced. It is obvious that the drawings are only some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

The embodiment of the present invention discloses a color shift compensation method and a device, capable of solving the color shift issue when the liquid crystal panel performs display to promote the display effect. The detail descriptions are conducted, respectively.

Figure 1:
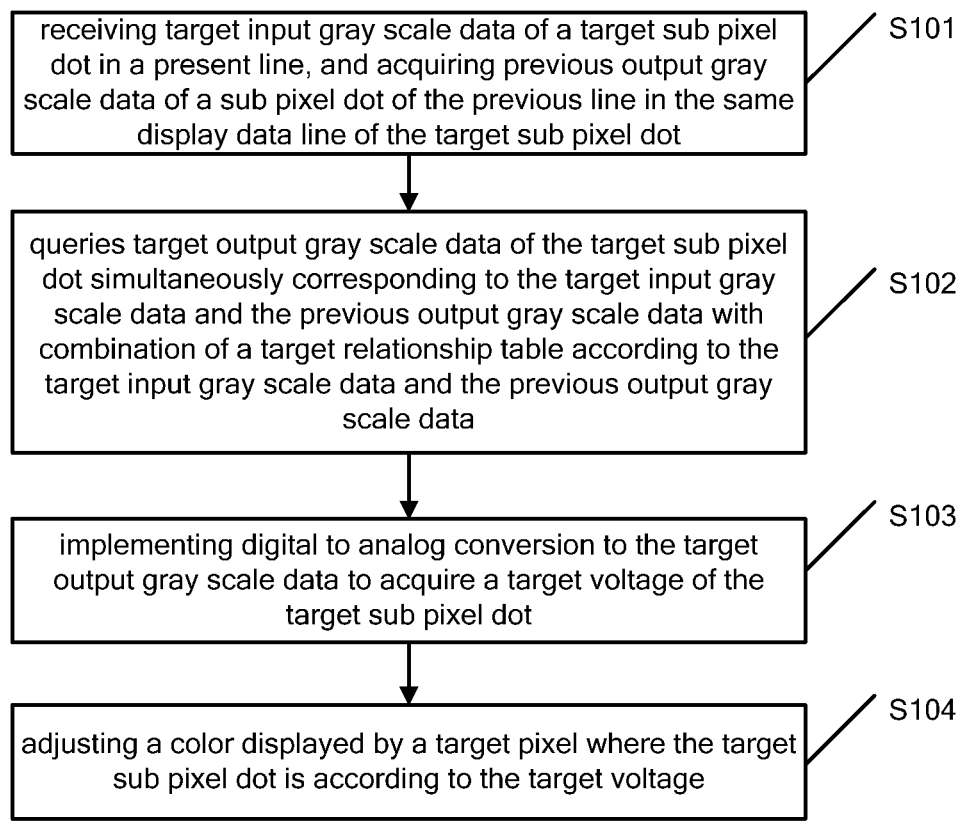
FIG. 1 is a flowchart of a color shift compensation method disclosed by the embodiment of the present invention.

Please refer to FIG. 1. FIG. 1 is a flowchart of a color shift compensation method disclosed by the embodiment of the present invention. The color shift compensation method shown in FIG. 1 can be applied to the TFT type liquid crystal display panel, the TN type liquid crystal display panel and the tri-gate type liquid crystal display panel. No restriction is claimed here in the embodiment of the present invention. As shown in FIG. 1, the color shift compensation method can comprises steps of:

step S101, the color shift compensation device receives target input gray scale data of a target sub pixel dot in a present line, and acquires previous output gray scale data of a sub pixel dot of the previous line in the same display data line of the target sub pixel dot.

In the embodiments of the present invention, the liquid crystal display panel is divided into a plurality of display areas, and each display area comprises a plurality of display lines aligned in row, and each display line comprises a plurality of pixel dots aligned in column, and each pixel dot comprises at least three sub pixel dots aligned in row, and the common three sub pixels in each pixel dot are sub pixels dots respectively representing R (red), G (green) and B (blue) colors, wherein each pixel dot can further comprise sub pixel dots of W (white) and Y (yellow) colors. No restriction is claimed here in the embodiment of the present invention.

In the embodiments of the present invention, the amount of the pixel dots included in each display line is fixed but the amount of the display lines included in each display area can be different. The division of the display areas to the liquid crystal display panel is based on the resistance properties of the fan section lines. The display areas of the liquid crystal display panel are symmetrically distributed according to the center line of the liquid crystal display panel. The amount of the display lines included in the display area which is closer to the center of the liquid crystal display panel is larger than the amounts of the display lines included in other display areas. The amounts of the display lines are sequentially decreased from the display areas in the middle to the display areas at two sides. Moreover, the amount if the display areas divided in the liquid crystal display panel can be performed according to the actual properties of the liquid crystal panel. No restriction is claimed here in the embodiment of the present invention.

In the embodiment of the present invention, the target sub pixel dot can be a sub pixel dot in any display area in the liquid crystal display panel. Therefore, the embodiment of the present invention can be applied to any display area in the liquid crystal display panel. No restriction is claimed here in the embodiment of the present invention.

In the embodiment of the present invention, the scan circuit of the liquid crystal display panel controls the drive integrated circuit to sequentially input gray scale data to the sub pixel dots of each row. The database of the color shift compensation device will store the output gray scale data of each sub pixel dot. Thus, as the color shift compensation device receives target input gray scale data of a target sub pixel dot in a present line, and the color shift compensation device will first acquire previous output gray scale data of a sub pixel dot of the previous line in the same display data line of the target sub pixel dot. The target sub pixel dot can be a sub pixel dot in the present line of any display line.

In the embodiment of the present invention, either of the input gray scale data or the output gray scale data is a digital signal to instruct the color shift compensation device to convert the digital signal to be an analog signal, i.e. a digital voltage with digital to analog conversion for controlling the color shift compensation device to apply the analog voltage to the target sub pixel dot.

step S102, the color shift compensation device queries target output gray scale data of the target sub pixel dot simultaneously corresponding to the target input gray scale data and the previous output gray scale data with combination of a target relationship table according to the target input gray scale data and the previous output gray scale data.

In the embodiment of the present invention, the target relationship table comprises corresponding relationships of input gray scale data of sub pixel dot of any row, output gray scale data of sub pixel dot of last row of the sub pixel dot of any row and output gray scale data of sub pixel dot of any row. Therefore, after the color shift compensation device acquires the target input gray scale data and the previous output gray scale data, the color shift compensation device queries target output gray scale data of the target sub pixel dot simultaneously corresponding to the target input gray scale data and the previous output gray scale data with combination of a target relationship table according to the target input gray scale data and the previous output gray scale data.

In the embodiment of the present invention, the value change range of the input gray scale data and output gray scale data stored in the target relationship table is determined according to the digit capacity of the digital to analog converter. If the digit capacity of the digital to analog converter is n, and then the value ranges of the importable digit capacities of the input gray scale data and output gray scale data are 0 to 2n−1. No restriction is claimed here in the embodiment of the present invention.

In the embodiment of the present invention, the target relationship table can be a corresponding relationship table of input gray scale data of sub pixel dot of any row, output gray scale data of sub pixel dot of last row of the sub pixel dot of any row and output gray scale data of sub pixel dot of any row in the display area where the target sub pixel dot is, or a corresponding relationship table of input gray scale data of sub pixel dot of any row, output gray scale data of sub pixel dot of last row of the sub pixel dot of any row and output gray scale data of sub pixel dot of any row in any display area in the liquid crystal display panel. No restriction is claimed here in the embodiment of the present invention. The target relationship table can be stored in the display area corresponded with the target relationship table, or stored in the database of the color shift compensation device. No restriction is claimed here in the embodiment of the present invention.

In the embodiment of the present invention, if the target relationship table is a corresponding relationship table of input gray scale data of sub pixel dot of any row, output gray scale data of sub pixel dot of last row of the sub pixel dot of any row and output gray scale data of sub pixel dot of any row in any display area in the liquid crystal display panel, and then, that the color shift compensation device queries target output gray scale data of the target sub pixel dot simultaneously corresponding to the target input gray scale data and the previous output gray scale data with combination of a target relationship table according to the target input gray scale data and the previous output gray scale data can be explained as that the color shift compensation device directly queries target output gray scale data of the target sub pixel dot simultaneously corresponding to the target input gray scale data and the previous output gray scale data from the target relationship table according to the target input gray scale data and the previous output gray scale data.

As an illustration, the table 1 is the target relationship table. The change range of the gray scale data in the target relationship table is 0-255, and only the representative gray scale data are partially listed in the target relationship table for reference. The other data can be calculated according to the data in the table with linear algorithm, or can be queried directly from the target relationship table. No restriction is claimed here in the embodiment of the present invention. As shown in table 1, if the target input gray scale data of the target sub pixel dot received by the color shift compensation device is 64, and the acquired previous output gray scale data of a sub pixel dot of the previous line in the same display data line of the target sub pixel dot is 128, then, the target output gray scale data of the sub pixel dot queried by the color shift compensation device according to the target output gray scale data and the previous output gray scale data with combination of a target relationship table is 62.

TABLE 1

| | output gray scale data of a previous sub pixel dot of the sub pixel dot of the present line | | | | | | | | |
|---|---|---|---|---|---|---|---|---|---|
| output gray scale data of a sub pixel dot of the present line | 0 | 32 | 64 | 96 | 128 | 160 | 192 | 224 | 255 |
| input gray scale data of a sub pixel dot of the present line  0 | 0 | 0 | 0 | 0 | 0 | 0 | 0 | 0 | 0 |
| 32 | 34 | 32 | 31 | 31 | 31 | 30 | 30 | 30 | 28 |
| 64 | 67 | 64 | 64 | 63 | 62 | 62 | 61 | 61 | 56 |
| 96 | 99 | 96 | 96 | 96 | 94 | 94 | 93 | 93 | 88 |
| 128 | 131 | 128 | 128 | 128 | 128 | 126 | 125 | 124 | 120 |
| 160 | 163 | 160 | 160 | 160 | 160 | 160 | 158 | 157 | 151 |
| 192 | 195 | 192 | 192 | 192 | 192 | 192 | 192 | 189 | 185 |
| 224 | 225 | 224 | 224 | 224 | 224 | 224 | 224 | 224 | 220 |
| 255 | 255 | 255 | 255 | 255 | 255 | 255 | 255 | 255 | 255 |

For another example, if the previous output gray scale data is 144, and the target input gray scale data of the target sub pixel dot is 112, and target output gray scale data simultaneously corresponding to the previous output gray scale data and the target input gray scale data cannot be directly looked up from the target relationship table given from the table 1, but the output gray scale data of a sub pixel dot of the present line simultaneously corresponding to the input gray scale data of a sub pixel dot of the present line, which is 96 and the output gray scale data of a previous sub pixel dot of the sub pixel dot of the present line, which is 128 that is queried from the table is 94, and the output gray scale data of a sub pixel dot of the present row simultaneously corresponding to the input gray scale data of a sub pixel dot of the present line, which is 128 and the output gray scale data of a previous sub pixel dot of the sub pixel dot of the present row, which is 160 that is queried from the table is 126. Therefore, the target output gray scale data simultaneously corresponding to the previous output gray scale data, which is 144 and the target input gray scale data, which is 112 can be calculated with linear algorithm to be obtained to be 110.

step S103, the color shift compensation device implements digital to analog conversion to the target output gray scale data to acquire a target voltage of the target sub pixel dot.

In the embodiment of the present invention, after the color shift compensation device queries target output gray scale data simultaneously corresponding to the target input gray scale data and the previous output gray scale data with combination of a target relationship table, the color shift compensation device implements digital to analog conversion to the acquired target output gray scale data to acquire a target voltage of the target sub pixel dot.

For example, supposing that the reference voltage is Vref, and the digital to analog converter has 8 digits. Then, the value ranges of the gray scale data is 0-255. Therefore, the voltage corresponded with gray scale data 0 is 0V, and the voltage corresponded with gray scale data m is m/255× $V_{ref}$V, wherein, m∈{0,255}. Therefore, as the target gray scale data queried by the color shift compensation device is 17, the target voltage of the target sub pixel dot acquired according to the digital to analog conversion is Vref/15V.

step S104, the color shift compensation device adjusts a color displayed by a target pixel where the target sub pixel dot is according to the target voltage.

In the embodiment of the present invention, the target sub pixel dot can be one sub pixel dot of RGB three sub pixel dots included in the target pixel dot. After the color shift compensation device converts the target output gray scale data to the target voltage by digital to analog conversion, the color shift compensation device can adjust the voltage of the target sub pixel to be the target voltage. Then, the target voltage can change the light transmission of the area covered by the target sub pixel dot, i.e. change the light intensity of the area covered by the target sub pixel dot, and thus, change the color displayed by the target pixel where the target sub pixel dot is.

In the embodiment of the present invention, the adjacent three sub pixel dots respectively representing R (red), G (green) and B (blue), three primary colors. Therefore, the three sub pixel dots can compose one pixel dot. The color display by the one pixel dot is determined by the values of the R, G, B lights transmitted from the three sub pixel dots representing the R, G, B three primary colors. Thus, as the voltage of the one sub pixel dot is changed, the color displayed by the pixel dot where the target sub pixel dot is can be changed.

In the embodiments of the present invention, the liquid crystal display panel is divided into a plurality of display areas, and each display area comprises a plurality of display lines aligned in row, and each display line comprises a plurality of pixel dots aligned in column, and each pixel dot comprises at least three sub pixel dots aligned in row. Therefore, as receiving target input gray scale data of a target sub pixel dot in a present line, the color shift compensation device acquires previous output gray scale data of a sub pixel dot of the previous line in the same display data line of the target sub pixel dot, and then, querying the target output gray scale data of the target sub pixel dot simultaneously corresponding to the target input gray scale data and the previous output gray scale data with combination of the target relationship table according to the target input gray scale data and the previous output gray scale data, and implementing digital to analog conversion to the target output gray scale data to acquire the target voltage of the target sub pixel dot, and ultimately, adjusting a color displayed by a target pixel corresponded with the target sub pixel dot according to the target voltage. With the embodiment of the present invention, the original voltage which should be applied to the target sub pixel can be adjusted to the voltage corresponding to the target output data for changing the color displayed by the target pixel where the target sub pixel dot is and accordingly, the color shift issue of the panel due to the impedance difference in the fan section can be solved to promote the display effect.

Figure 2:
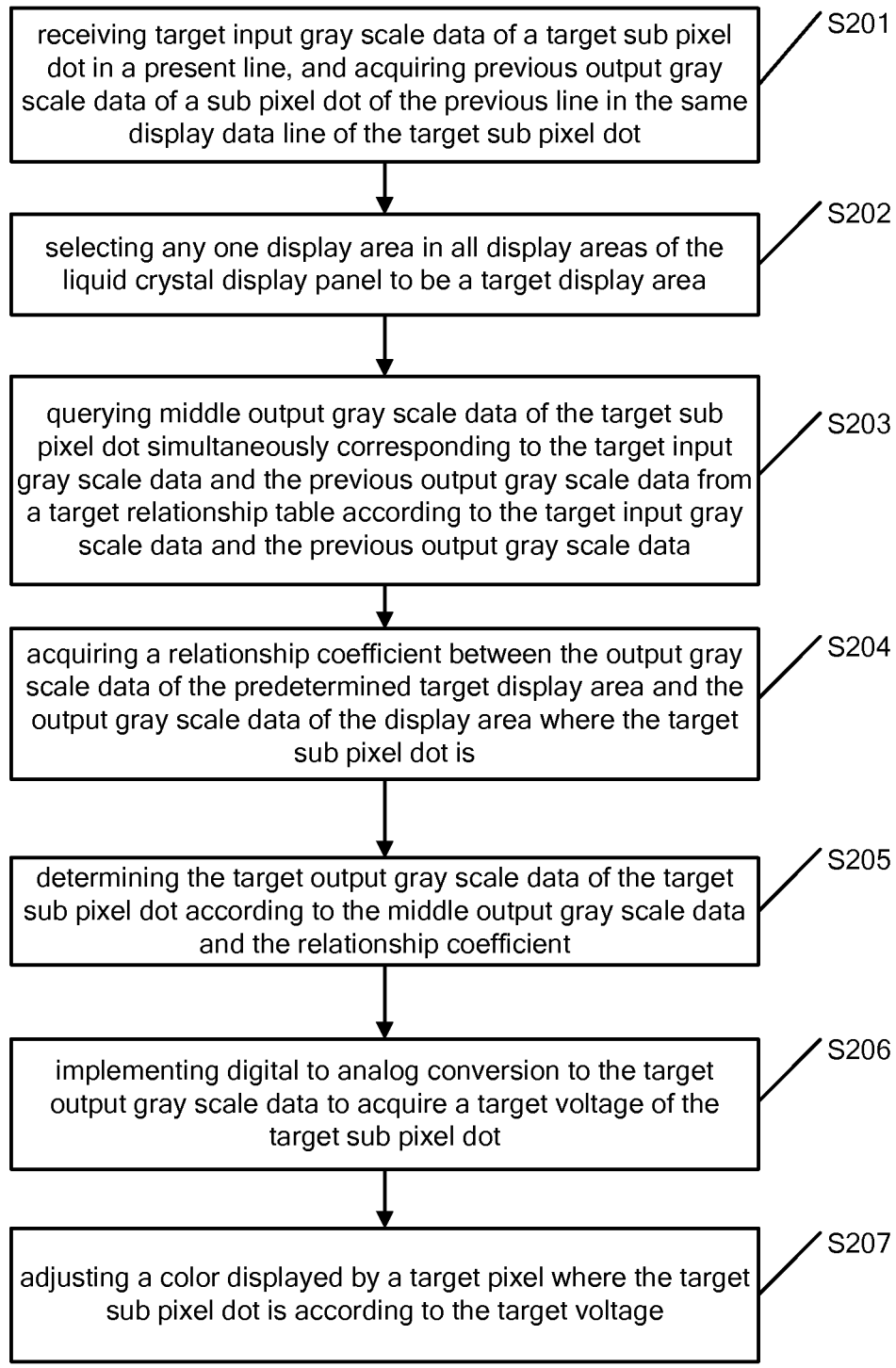
FIG. 2 is a flowchart of another color shift compensation method disclosed by the embodiment of the present invention.

Please refer to FIG. 2. FIG. 2 is a flowchart of another color shift compensation method disclosed by the embodiment of the present invention. The color shift compensation method shown in FIG. 2 can be applied to the TFT type liquid crystal display panel, the TN type liquid crystal display panel and the tri-gate type liquid crystal display panel. No restriction is claimed here in the embodiment of the present invention. As shown in FIG. 2, the color shift compensation method can comprise steps of:

step S201, the color shift compensation device receives target input gray scale data of a target sub pixel dot in a present line, and acquires previous output gray scale data of a sub pixel dot of the previous line in the same display data line of the target sub pixel dot.

step S202, the color shift compensation device judges whether the target input gray scale data and the previous output gray scale data are identical or not, and if not, then executes step S203; if yes, then employs the target input gray scale data to be the target output gray scale data, and executes step S207.

In the embodiment of the present invention, after the color shift compensation device acquires the target output gray scale data and the previous output gray scale data, the color shift compensation device judges whether the acquired target input gray scale data and the previous output gray scale data are identical or not. If it is judged that the target input gray scale data and the previous output gray scale data are not identical, it is necessary to acquire the target output gray scale data of the target sub pixel dot simultaneously corresponding to the target input gray scale data and the previous output gray scale data with looking up the table; if it is judged that the target input gray scale data and the previous output gray scale data are not identical, it can be understood from the table 1 provided by the embodiment of the method shown in FIG. 1. As the input gray scale data of the sub pixel dot in the present line and the output gray scale data of the sub pixel dot in the previous line are the same, the output gray scale data of the sub pixel dot in the present line remains unchanged. Therefore, the procedure of looking up the table is not necessary, and the target input gray scale data of the target sub pixel dot can be directly employed to be the target output gray scale data of the target sub pixel dot.

step S203, as it is judged that the target input gray scale data and the previous output gray scale data are not identical in step S202, the color shift compensation device selects any one display area in all display areas of the liquid crystal display panel to be a target display area.

In the embodiment of the present invention, the color shift compensation device will prestore the target relationship table comprises corresponding relationships of input gray scale data of sub pixel dot of any row, output gray scale data of sub pixel dot of last row of the sub pixel dot of any row and output gray scale data of sub pixel dot of any row. The target relationship table can be a corresponding relationship table of input gray scale data of sub pixel dot of any row, output gray scale data of sub pixel dot of last row of the sub pixel dot of any row and output gray scale data of sub pixel dot of any row in the display area where the target sub pixel dot is, or a corresponding relationship table of input gray scale data of sub pixel dot of any row, output gray scale data of sub pixel dot of last row of the sub pixel dot of any row and output gray scale data of sub pixel dot of any row in any display area in the liquid crystal display panel. The sub pixel dot of any row can be explained to be a sub pixel dot in the present line. Therefore, the sub pixel dot of last line of the sub pixel dot of any line can be explained to be a previous sub pixel dot of the sub pixel dot of the present line.

In the embodiment of the present invention, the color shift compensation device will arbitrarily select one display area from all display areas of the liquid crystal display panel to be the target display area. Therefore, the target relationship table is a corresponding relationship table of input gray scale data of sub pixel dot of any row, output gray scale data of sub pixel dot of last row of the sub pixel dot of any row and output gray scale data of sub pixel dot of any row.

S204, the color shift compensation device queries middle output gray scale data of the target sub pixel dot simultaneously corresponding to the target input gray scale data and the previous output gray scale data from a target relationship table according to the target input gray scale data and the previous output gray scale data.

In the embodiment of the present invention, after the color shift compensation device acquires the target input gray scale data and the previous output gray scale data, the color shift compensation device will look up middle output gray scale data of the target sub pixel dot simultaneously corresponding to the target input gray scale data and the previous output gray scale data from a target relationship table according to the target input gray scale data and the previous output gray scale data. The middle output gray scale data is output gray scale data of the target sub pixel dot simultaneously corresponding to the target input gray scale data and the previous output gray scale data of the target display area but not the output gray scale data of the target sub pixel dot.

In the embodiment of the present invention, the procedure of querying middle output gray scale data of the target sub pixel dot simultaneously corresponding to the target input gray scale data and the previous output gray scale data from the target relationship table can be consistent with the procedure of directly querying target output gray scale data of the target sub pixel dot simultaneously corresponding to the target input gray scale data and the previous output gray scale data from the target relationship table of the display area where the target sub pixel dot is provided in the embodiment of the method shown in FIG. 1. It can be directly queried by looking up the table or can be calculated according to the data in the table with linear algorithm. No restriction is claimed here in the embodiment of the present invention.

S205, the color shift compensation device acquires a relationship coefficient between the output gray scale data of the predetermined target display area and the output gray scale data of the display area where the target sub pixel dot is.

In the embodiment of the present invention, in the entire liquid crystal display panel, there is only one target relationship table. The target relationship table is a gray scale data relationship table in the target display area. The color shift compensation stores a relationship coefficient table of the output gray scale data of the target display area and the output gray scale data of each display area. Therefore, as desiring to acquire the output gray scale data of the present row simultaneously corresponding to the input gray scale data of the present line of each display area and the previous output gray scale data, it is necessary to look up the middle output gray scale data of the target display area simultaneously corresponding to the target input gray scale data and the previous output gray scale data from the target relationship table, and then to acquire the a relationship coefficient between the output gray scale data of the predetermined target display area and the output gray scale data of the display area where the target sub pixel dot is from the relationship coefficient table of the output gray scale data of the target display area and the output gray scale data of each display area.

S206, the color shift compensation device determines the target output gray scale data of the target sub pixel dot according to the middle output gray scale data and the relationship coefficient.

In the embodiment of the present invention, after the color shift compensation device acquires the middle output gray scale data and the relationship coefficient, the color shift compensation device will determine the target output gray scale data of the target sub pixel dot according to the middle output gray scale data and the relationship coefficient.

For example, as shown in table 1 in the embodiment of the method shown in FIG. 1, the target input gray scale data of the target sub pixel dot acquired by the color shift compensation device is 32, and the previous output gray scale data of the sub pixel dot of the previous line of the target sub pixel dot is 192. Then, the middle output gray scale data simultaneously corresponding to the target input gray scale data and the previous output gray scale data which can be queried from the table 1 is 30. If the relationship coefficient of the target display area and the output gray scale data of the display area where the target sub pixel dot is is 0.75. Then, the target output gray scale data of the target sub pixel dot can be acquired to be 30*0.75=22.5.

S207, the color shift compensation device implements digital to analog conversion to the target output gray scale data to acquire a target voltage of the target sub pixel dot.

In the embodiment of the present invention, as it is judged that the target input gray scale data and the previous output gray scale data are identical in the step S202, the color shift compensation device employs the target input gray scale data to be the target output gray scale data and then, the digital to analog conversion will be implemented to the target output gray scale data to acquire a target voltage of the target sub pixel dot.

In the embodiment of the present invention, after determining the target output gray scale data of the target sub pixel dot in Step S206, the color shift compensation device also will implement digital to analog conversion to the target output gray scale data to acquire a target voltage of the target sub pixel dot.

S207, the color shift compensation device adjusts a color displayed by a target pixel where the target sub pixel dot is according to the target voltage.

As being a practical embodiment, the specific way that the color shift compensation device adjusts the color displayed by a target pixel where the target sub pixel dot is according to the target voltage can comprise steps of:

step 11, the color shift compensation device adjusts a voltage of the target sub pixel dot to the target voltage;

step 12, the color shift compensation device twists liquid crystal molecules of the target sub pixel dot to a target twist angle according to the target voltage;

step 13, the color shift compensation device adjusts a light intensity of the target sub pixel dot according to the target twist angle to adjust a color displayed by a target pixel where the target sub pixel dot is.

In the embodiment of the present invention, the liquid crystal molecules of the target sub pixel dot can be considered to be liquid crystal molecules in the area covered by the target sub pixel dot. Therefore, after the color shift compensation device implements digital to analog conversion to the target output gray scale data to acquire the target voltage of the target sub pixel dot, the voltage of the target sub pixel is adjusted to the target voltage to twist liquid crystal molecules of the target sub pixel dot to a target twist angle according to the target voltage. Thus, the light volume transmitting the liquid crystal molecules can be adjusted, and thus, the light ratio of the RGB three primary colors of the target pixel dot where the target sub pixel dot is can be changed for changing the color displayed by the target pixel where the target sub pixel dot is. The color displayed by the target pixel dot is determined by the values of the lights transmitted from the three sub pixel dots of the target pixel dot. If the voltage of the target sub pixel dot is changed, the twist angle of the liquid crystal molecules of the target sub pixel dot will be changed. Thus, the light volumes of the lights transmitting through the liquid crystal molecules in the area covered by the target sub pixel dot is changed, and the color displayed by the target pixel dot changes. Thereby, the color shift compensation device can control color display by the target pixel dot where the target sub pixel dot is to be the corresponding color of the target output gray scale data as displaying.

For example, supposing that the target sub pixel dot is G sub pixel dot, and if the color shift compensation device directly employs the target input gray scale data 128 of the G sub pixel dot to be the target output gray scale data. Then, the target output gray scale data at this time point is 128, and the target voltage of the G sub pixel dot will be 0.50 Vref. Therefore, the color display by the target pixel dot where the G sub pixel is, and particularly the color display by the target pixel dot of the middle area in the liquid crystal display panel might bias green in comparison with other pixel dots. If the target output gray scale data simultaneously corresponding to the target input gray scale data 128 and the previous output gray scale data 160 queried by the color shift compensation device from the target relationship table is 126. Then, the target voltage of the target sub pixel dot acquired by the color shift compensation device with digital to analog conversion is 0.49Vref. According to the target voltage, the twist angle of the liquid crystal molecules of the target sub pixel dot is adjusted to the target twist angle corresponding to 0.49 Vref. Thus, the color shift compensation device can determine the volume of the green light corresponding to the G sub pixel dot transmitting the liquid crystal molecules in the area covered by the target sub pixel dot. The ratio of the G light in RGB of the target pixel dot where the G sub pixel dot is can be changed, and accordingly, the color displayed by the target pixel can be changed.

As being a practical embodiment, the specific way that the color shift compensation device adjusts the voltage of the target sub pixel dot to the target voltage can comprise steps of:

step 21, the color shift compensation device judges whether the target voltage is larger than the present voltage of the target sub pixel dot;

step 22, as judging that the target voltage is larger than the present voltage of the target sub pixel dot, the color shift compensation device amplifies the present voltage of the target sub pixel dot to the target voltage;

step 23, as judging that the target voltage is smaller than the present voltage of the target sub pixel dot, the color shift compensation device diminishes the present voltage of the target sub pixel dot to the target voltage.

In the embodiment of the present invention, after the color shift compensation device implements digital to analog conversion to the target output gray scale data to acquire the target voltage of the target sub pixel dot, the relationship of the target voltage and the present voltage of the target sub pixel dot is judged, first. If the target voltage is larger than the present voltage of the target sub pixel dot, the color shift compensation device will need to charge the target sub pixel dot to increase voltage of the target sub pixel dot to the target voltage. If the target voltage is smaller than the present voltage of the target sub pixel dot, the color shift compensation device will need to discharge the target sub pixel dot to decrease voltage of the target sub pixel dot to the target voltage. If the target voltage and the present voltage of the target sub pixel dot are identical, the color shift compensation device will keep the voltage of the target sub pixel dot.

In the embodiments of the present invention, the liquid crystal display panel is divided into a plurality of display areas, and each display area comprises a plurality of display lines aligned in row, and each display line comprises a plurality of pixel dots aligned in column, and each pixel dot comprises at least three sub pixel dots aligned in row. Therefore, as receiving target input gray scale data of a target sub pixel dot in a present line, the color shift compensation device acquires previous output gray scale data of a sub pixel dot of the previous line in the same display data line of the target sub pixel dot, and then, querying the target output gray scale data of the target sub pixel dot simultaneously corresponding to the target input gray scale data and the previous output gray scale data with combination of the target relationship table according to the target input gray scale data and the previous output gray scale data, and implementing digital to analog conversion to the target output gray scale data to acquire the target voltage of the target sub pixel dot, and ultimately, adjusting a color displayed by a target pixel corresponded with the target sub pixel dot according to the target voltage. In all display areas of the liquid crystal display panel, the target relationship table aiming at one display area is set. Because it needs register addresses for storing the target relationship table, the register addresses can be decreased and the production cost can be saved if there is only one target relationship table. With the embodiment of the present invention, the original voltage which should be applied to the target sub pixel can be adjusted to the voltage corresponding to the target output data for changing the color displayed by the target pixel where the target sub pixel dot is and accordingly, the color shift issue of the panel due to the impedance difference can be solved to promote the display effect.

Figure 3:
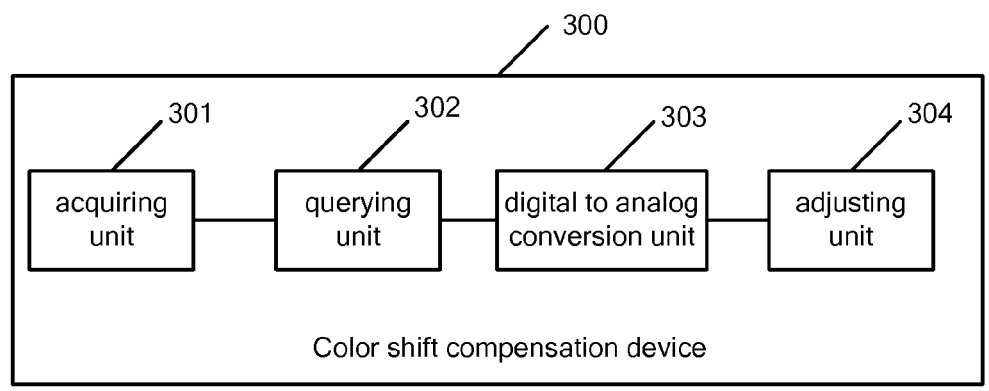
FIG. 3 is a structural diagram of a color shift compensation device disclosed by the embodiment of the present invention.

Please refer to FIG. 3. FIG. 3 is a structural diagram of a color shift compensation device disclosed by the embodiment of the present invention. The color shift compensation device 300 shown in FIG. 3 can be applied to the TFT type liquid crystal display panel, the TN type liquid crystal display panel and the tri-gate type liquid crystal display panel. No restriction is claimed here in the embodiment of the present invention. As shown in FIG. 3, the color shift compensation device 300 can comprise the units below:

an acquiring unit 301, receiving target input gray scale data of a target sub pixel dot in a present line, and acquiring previous output gray scale data of a sub pixel dot of the previous line in the same display data line of the target sub pixel dot.

In the embodiments of the present invention, the liquid crystal display panel is divided into a plurality of display areas, and each display area comprises a plurality of display lines aligned in row, and each display line comprises a plurality of pixel dots aligned in column, and each pixel dot comprises at least three sub pixel dots aligned in row, and the common three sub pixels in each pixel dot are sub pixels dots respectively representing R (red), G (green) and B (blue) colors, wherein each pixel dot can further comprise sub pixel dots of W (white) and Y (yellow) colors. No restriction is claimed here in the embodiment of the present invention.

In the embodiments of the present invention, the amount of the pixel dots included in each display line is fixed but the amount of the display lines included in each display area can be different. The division of the display areas to the liquid crystal display panel is based on the resistance properties of the fan section lines. The display areas of the liquid crystal display panel are symmetrically distributed according to the center line of the liquid crystal display panel. The amount of the display lines included in the display area which is closer to the center of the liquid crystal display panel is larger than the amounts of the display lines included in other display areas. The amounts of the display lines are sequentially decreased from the display areas in the middle to the display areas at two sides. Moreover, the amount if the display areas divided in the liquid crystal display panel can be performed according to the actual properties of the liquid crystal panel. No restriction is claimed here in the embodiment of the present invention.

In the embodiment of the present invention, the target sub pixel dot can be a sub pixel dot in any display area in the liquid crystal display panel. Therefore, the embodiment of the present invention can be applied to any display area in the liquid crystal display panel. No restriction is claimed here in the embodiment of the present invention.

In the embodiment of the present invention, the scan circuit of the liquid crystal display panel controls the drive integrated circuit to sequentially input gray scale data to the sub pixel dots of each row. The database of the color shift compensation device 300 will store the output gray scale data of each sub pixel dot. Thus, after the acquiring unit 301 receives target input gray scale data of a target sub pixel dot in a present line, it acquires previous output gray scale data of a sub pixel dot of the previous line in the same display data line of the target sub pixel dot. The target sub pixel dot can be a sub pixel dot in the present line of any display line.

In the embodiment of the present invention, either of the input gray scale data or the output gray scale data is a digital signal to instruct the color shift compensation device 300 to convert the digital signal to be an analog signal, i.e. a digital voltage with digital to analog conversion for controlling the color shift compensation device 300 to apply the analog voltage to the target sub pixel dot.

The querying unit 302 is employed for querying target output gray scale data of the target sub pixel dot simultaneously corresponding to the target input gray scale data and the previous output gray scale data with combination of a target relationship table according to the target input gray scale data and the previous output gray scale data acquired by the aforesaid acquiring unit 301.

In the embodiment of the present invention, the target relationship table comprises corresponding relationships of input gray scale data of sub pixel dot of any row, output gray scale data of sub pixel dot of last row of the sub pixel dot of any row and output gray scale data of sub pixel dot of any row. Therefore, after the acquiring unit 301 acquires the target input gray scale data and the previous output gray scale data, the querying unit 302 queries target output gray scale data of the target sub pixel dot simultaneously corresponding to the target input gray scale data and the previous output gray scale data with combination of a target relationship table according to the target input gray scale data and the previous output gray scale data.

In the embodiment of the present invention, the value change range of the input gray scale data and output gray scale data stored in the target relationship table is determined according to the digit capacity of the digital to analog converter. If the digit capacity of the digital to analog converter is n, and then the value ranges of the importable digit capacities of the input gray scale data and output gray scale data are 0 to 2n−1. No restriction is claimed here in the embodiment of the present invention.

In the embodiment of the present invention, the target relationship table can be a corresponding relationship table of input gray scale data of sub pixel dot of any row, output gray scale data of sub pixel dot of last row of the sub pixel dot of any row and output gray scale data of sub pixel dot of any row in the display area where the target sub pixel dot is, or a corresponding relationship table of input gray scale data of sub pixel dot of any row, output gray scale data of sub pixel dot of last row of the sub pixel dot of any row and output gray scale data of sub pixel dot of any row in any display area in the liquid crystal display panel. No restriction is claimed here in the embodiment of the present invention. The target relationship table can be stored in the display area corresponded with the target relationship table, or stored in the database of the color shift compensation device 300. No restriction is claimed here in the embodiment of the present invention.

In the embodiment of the present invention, if the target relationship table is a corresponding relationship table of input gray scale data of sub pixel dot of any row, output gray scale data of sub pixel dot of last row of the sub pixel dot of any row and output gray scale data of sub pixel dot of any row in any display area in the liquid crystal display panel, and then, that the querying unit 302 queries target output gray scale data of the target sub pixel dot simultaneously corresponding to the target input gray scale data and the previous output gray scale data with combination of a target relationship table according to the target input gray scale data and the previous output gray scale data can be explained as that the querying unit 302 directly queries target output gray scale data of the target sub pixel dot simultaneously corresponding to the target input gray scale data and the previous output gray scale data from the target relationship table according to the target input gray scale data and the previous output gray scale data.

As an illustration, with combination of the target relationship table provided in the first embodiment, the change range of the gray scale data in the target relationship table is 0-255, and only the representative gray scale data are partially listed in the target relationship table for reference. The other data can be calculated according to the data in the table with linear algorithm, or can be queried directly from the target relationship table. No restriction is claimed here in the embodiment of the present invention. As shown in table 1, if the target input gray scale data of the target sub pixel dot received by the acquiring unit 301 is 64, and the acquired previous output gray scale data of a sub pixel dot of the previous line in the same display data line of the target sub pixel dot is 128, then, the target output gray scale data of the sub pixel dot queried by the querying unit 302 according to the target output gray scale data and the previous output gray scale data with combination of a target relationship table according to the target output gray scale data and the previous output gray scale data acquired by the acquiring unit 301 is 62.

For another example, if the previous output gray scale data is 144, and the target input gray scale data of the target sub pixel dot is 112, and target output gray scale data simultaneously corresponding to the previous output gray scale data and the target input gray scale data cannot be directly looked up from the target relationship table given from the table 1, but the output gray scale data of a sub pixel dot of the present line simultaneously corresponding to the input gray scale data of a sub pixel dot of the present line, which is 96 and the output gray scale data of a previous sub pixel dot of the sub pixel dot of the present line, which is 128 that is queried from the table by the querying unit 302 is 94, and the output gray scale data of a sub pixel dot of the present line simultaneously corresponding to the input gray scale data of a sub pixel dot of the present line, which is 128 and the output gray scale data of a previous sub pixel dot of the sub pixel dot of the present line, which is 160 that is queried from the table is 126. Therefore, the target output gray scale data simultaneously corresponding to the previous output gray scale data, which is 144 and the target input gray scale data, which is 112 can be calculated with linear algorithm to be obtained to be 110.

a digital to analog conversion unit 303, implementing digital to analog conversion to the target output gray scale data queried by the aforesaid querying unit 302 to acquire a target voltage of the target sub pixel dot.

In the embodiment of the present invention after the querying unit 302 queries target output gray scale data of the target sub pixel dot simultaneously corresponding to the target input gray scale data and the previous output gray scale data with combination of a target relationship table, the digital to analog conversion unit 303 implements digital to analog conversion to the queried target output gray scale data to acquire a target voltage of the target sub pixel dot.

For example, supposing that the reference voltage is Vref, and the digital to analog converter has 8 digits. Then, the value ranges of the gray scale data is 0-255. Therefore, the voltage corresponded with gray scale data 0 is 0V, and the voltage corresponded with gray scale data m is m/255× $V_{ref}$V, wherein, m∈{0,255}. Therefore, as the target gray scale data queried by the querying unit 302 is 17, the target voltage of the target sub pixel dot acquired by the digital to analog conversion unit 303 according to the digital to analog conversion is Vref/15V.

An adjusting unit 304, adjusting a color displayed by a target pixel where the target sub pixel dot is according to the target voltage.

In the embodiment of the present invention, the target sub pixel dot can be one sub pixel dot of RGB three sub pixel dots included in the target pixel dot. After the digital to analog conversion unit 303 converts the target output gray scale data to the target voltage by digital to analog conversion, the adjusting unit 304 can adjust the voltage of the target sub pixel to be the target voltage. Then, the target voltage can change the light transmission of the area covered by the target sub pixel dot, i.e. change the light intensity of the area covered by the target sub pixel dot, and thus, change the color displayed by the target pixel where the target sub pixel dot is.

In the embodiment of the present invention, the adjacent three sub pixel dots respectively representing R (red), G (green) and B (blue), three primary colors. Therefore, the three sub pixel dots can compose one pixel dot. The color display by the one pixel dot is determined by the values of the R, G, B lights transmitted from the three sub pixel dots representing the R, G, B three primary colors. Thus, as the voltage of the one sub pixel dot is changed, the color displayed by the pixel dot where the target sub pixel dot is can be changed.

In the embodiments of the present invention, the liquid crystal display panel is divided into a plurality of display areas, and each display area comprises a plurality of display lines aligned in row, and each display line comprises a plurality of pixel dots aligned in column, and each pixel dot comprises at least three sub pixel dots aligned in row. Therefore, as receiving target input gray scale data of a target sub pixel dot in a present line, the color shift compensation device acquires previous output gray scale data of a sub pixel dot of the previous line in the same display data line of the target sub pixel dot, and then, querying the target output gray scale data of the target sub pixel dot simultaneously corresponding to the target input gray scale data and the previous output gray scale data with combination of the target relationship table according to the target input gray scale data and the previous output gray scale data, and implementing digital to analog conversion to the target output gray scale data to acquire the target voltage of the target sub pixel dot, and ultimately, adjusting a color displayed by a target pixel corresponded with the target sub pixel dot according to the target voltage. With the embodiment of the present invention, the original voltage which should be applied to the target sub pixel can be adjusted to the voltage corresponding to the target output data for changing the color displayed by the target pixel where the target sub pixel dot is and accordingly, the color shift issue of the panel due to the impedance difference in the fan section can be solved to promote the display effect.

Figure 4:
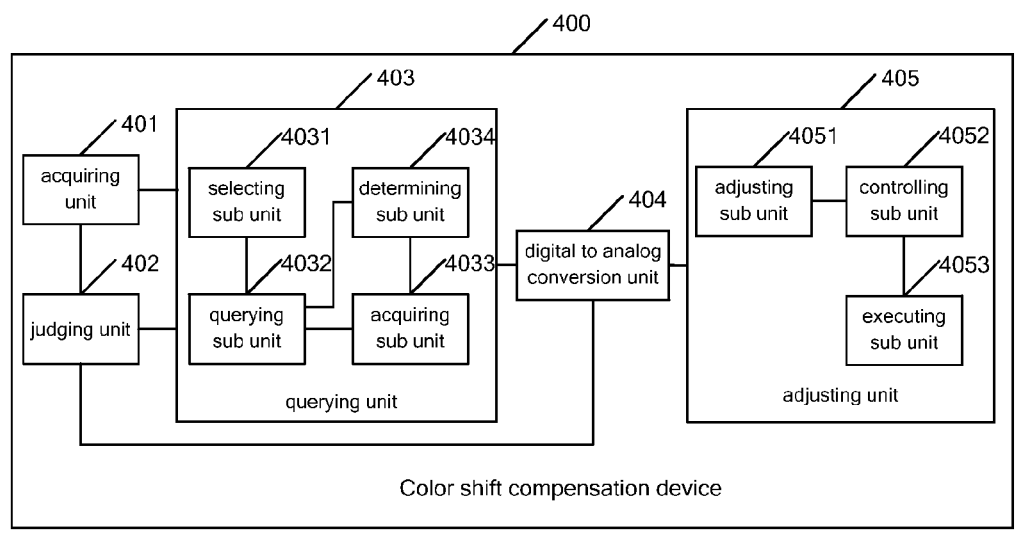
FIG. 4 is a structural diagram of another color shift compensation device disclosed by the embodiment of the present invention.

Please refer to FIG. 4. FIG. 4 is a structural diagram of another color shift compensation device disclosed by the embodiment of the present invention. The color shift compensation device 400 shown in FIG. 4 can be applied to the TFT type liquid crystal display panel, the TN type liquid crystal display panel and the tri-gate type liquid crystal display panel. No restriction is claimed here in the embodiment of the present invention. The acquiring unit 401 and the digital to analog conversion unit 403 have the same functions of the acquiring unit 301 and the digital to analog conversion unit 303 in the color shift compensation device 300 shown in FIG. 3. The repeated description is omitted in the embodiment of the present invention. As shown in FIG. 4, the color shift compensation device 400 can comprise:

an acquiring unit 401, receiving target input gray scale data of a target sub pixel dot in a present line, and acquiring previous output gray scale data of a sub pixel dot of the previous line in the same display data line of the target sub pixel dot.

a judging unit 402, judging whether the target input gray scale data and the previous output gray scale data acquired by the aforesaid acquiring unit 401 are identical or not.

In the embodiment of the present invention, after the acquiring unit 401 acquires the target output gray scale data and the previous output gray scale data, the judging unit 402 judges whether the acquired target input gray scale data and the previous output gray scale data are identical or not. If the judging unit 402 judges that the target input gray scale data and the previous output gray scale data are not identical, the querying unit 403 has to acquire the target output gray scale data of the target sub pixel dot simultaneously corresponding to the target input gray scale data and the previous output gray scale data with looking up the table; if the judging unit 402 judges that the target input gray scale data and the previous output gray scale data are not identical, it can be understood from the table 1 provided by the embodiment of the method shown in FIG. 1. As the input gray scale data of the sub pixel dot in the present line and the output gray scale data of the sub pixel dot in the previous line are the same, the output gray scale data of the sub pixel dot in the present line remains unchanged. Therefore, the procedure of looking up the table is not necessary, and the target input gray scale data of the target sub pixel dot can be directly employed to be the target output gray scale data of the target sub pixel dot.

a querying unit 302 querying target output gray scale data of the target sub pixel dot simultaneously corresponding to the target input gray scale data and the previous output gray scale data with combination of a target relationship table according to the target input gray scale data and the previous output gray scale data acquired by the aforesaid acquiring unit 401 as the judging unit 402 judges that the target input gray scale data and the previous output gray scale data are not identical.

As being a practical option, the querying unit 403 can comprise a selecting sub unit 4031, a querying sub unit 4032, an acquiring sub unit 4033 and a determining sub unit 4034, wherein:

the selecting unit 4031 is employed for selecting any one display area in all display areas of the liquid crystal display panel to be a target display area;

The querying sub unit 4032 is employed for querying middle output gray scale data of the target sub pixel dot simultaneously corresponding to the target input gray scale data and the previous output gray scale data from the target relationship table according to the target input gray scale data and the previous output gray scale data acquired by the aforesaid acquiring unit 401.

The acquiring sub unit 4033 is employed for acquiring a relationship coefficient between the output gray scale data of the predetermined target display area and the output gray scale data of the display area where the target sub pixel dot is.

The determining sub unit 4034 is employed for determining the target output gray scale data of the target sub pixel dot according to the middle output gray scale data queried by the querying sub unit 4032 and the relationship coefficient acquired by the acquiring sub unit 4033.

In the embodiment of the present invention, the color shift compensation device 400 will prestore the target relationship table comprises corresponding relationships of input gray scale data of sub pixel dot of any row, output gray scale data of sub pixel dot of last row of the sub pixel dot of any row and output gray scale data of sub pixel dot of any row. The target relationship table can be a corresponding relationship table of input gray scale data of sub pixel dot of any row, output gray scale data of sub pixel dot of last row of the sub pixel dot of any row and output gray scale data of sub pixel dot of any row in the display area where the target sub pixel dot is, or a corresponding relationship table of input gray scale data of sub pixel dot of any row, output gray scale data of sub pixel dot of last row of the sub pixel dot of any row and output gray scale data of sub pixel dot of any row in any display area in the liquid crystal display panel. The sub pixel dot of any row can be explained to be a sub pixel dot in the present line. Therefore, the sub pixel dot of last line of the sub pixel dot of any line can be explained to be a previous sub pixel dot of the sub pixel dot of the present line.

In the embodiment of the present invention, the selecting sub unit 4031 will arbitrarily select one display area from all display areas of the liquid crystal display panel to be the target display area. Therefore, the target relationship table is a corresponding relationship table of input gray scale data of sub pixel dot of any row, output gray scale data of sub pixel dot of last row of the sub pixel dot of any row and output gray scale data of sub pixel dot of any row.

In the embodiment of the present invention, after the acquiring unit 401 acquires the target input gray scale data and the previous output gray scale data, the querying sub unit 4032 will look up middle output gray scale data of the target sub pixel dot simultaneously corresponding to the target input gray scale data and the previous output gray scale data from a target relationship table according to the target input gray scale data and the previous output gray scale data. The middle output gray scale data is output gray scale data of the target sub pixel dot simultaneously corresponding to the target input gray scale data and the previous output gray scale data of the target display area but not the output gray scale data of the target sub pixel dot.

In the embodiment of the present invention, the procedure of querying middle output gray scale data of the target sub pixel dot simultaneously corresponding to the target input gray scale data and the previous output gray scale data from the target relationship table by the querying sub unit 4032 can be consistent with the procedure of directly querying target output gray scale data of the target sub pixel dot simultaneously corresponding to the target input gray scale data and the previous output gray scale data from the target relationship table of the display area where the target sub pixel dot by the querying unit 302 is provided in the embodiment of the method shown in FIG. 1. It can be directly queried by looking up the table or can be calculated according to the data in the table with linear algorithm. No restriction is claimed here in the embodiment of the present invention.

In the embodiment of the present invention, in the entire liquid crystal display panel, there is only one target relationship table. The target relationship table is a gray scale data relationship table in the target display area. The color shift compensation stores a relationship coefficient table of the output gray scale data of the target display area and the output gray scale data of each display area. Therefore, as desiring to acquire the output gray scale data of the present line simultaneously corresponding to the input gray scale data of the present line of each display area and the previous output gray scale data, the querying sub unit 4032 needs to look up the middle output gray scale data of the target display area simultaneously corresponding to the target input gray scale data and the previous output gray scale data from the target relationship table, and then, the acquiring sub unit 4033 acquires the a relationship coefficient between the output gray scale data of the predetermined target display area and the output gray scale data of the display area where the target sub pixel dot is from the relationship coefficient table of the output gray scale data of the target display area and the output gray scale data of each display area.

In the embodiment of the present invention, after the querying sub unit 4032 queries the middle output gray scale data and the acquiring sub unit 4033 acquires the relationship coefficient, the determining sub unit 4034 will determine the target output gray scale data of the target sub pixel dot according to the middle output gray scale data and the relationship coefficient.

For example, as shown in table 1 in the embodiment of the method shown in FIG. 1, the target input gray scale data of the target sub pixel dot acquired by the acquiring unit 401 is 32, and the previous output gray scale data of the sub pixel dot of the previous line of the target sub pixel dot is 192. The judging unit 402 judges that the target input gray scale data and the previous output gray scale data are not identical. Then, the middle output gray scale data simultaneously corresponding to the target input gray scale data and the previous output gray scale data which can be queried from the table 1 by the querying sub unit 4032 is 30. If the relationship coefficient of the target display area and the output gray scale data of the display area where the target sub pixel dot is acquired by the acquiring sub unit 4033 is 0.75. Then, the target output gray scale data of the target sub pixel dot can be acquired by the determining sub unit 4034 is 30*0.75=22.5.

a digital to analog conversion unit 404, implementing digital to analog conversion to the target output gray scale data to acquire a target voltage of the target sub pixel dot.

In the embodiment of the present invention, as the aforesaid judging unit 402 judges that the target input gray scale data and the previous output gray scale data are identical, the color shift compensation 400 employs the target input gray scale data to be the target output gray scale data and then, the digital to analog conversion unit 404 will implement digital to analog conversion to the target output gray scale data to acquire a target voltage of the target sub pixel dot.

In the embodiment of the present invention, after the aforesaid querying unit 403 queries the target output gray scale data of the target sub pixel dot, the digital to analog conversion unit 404 also will implement digital to analog conversion to the target output gray scale data to acquire a target voltage of the target sub pixel dot.

an adjusting unit 405, adjusting a color displayed by a target pixel where the target sub pixel dot is according to the target voltage acquired by the digital to analog conversion unit 404.

As being a practical embodiment, the adjusting unit 405 can comprise an adjusting sub unit 4051, a controlling sub unit 4052 and an executing sub unit 4053, wherein:

the adjusting sub unit 4051 is employed for adjusting a voltage of the target sub pixel dot to the target voltage.

The controlling sub unit 4052 is employed for twisting liquid crystal molecules of the target sub pixel dot to a target twist angle according to the target voltage.

The executing sub unit 4053 is employed for adjusting a light intensity of the target sub pixel dot according to the target twist angle twisted by the controlling sub unit to adjust a color displayed by a target pixel where the target sub pixel dot is.

In the embodiment of the present invention, the liquid crystal molecules of the target sub pixel dot can be considered to be liquid crystal molecules in the area covered by the target sub pixel dot. Therefore, after the digital to analog conversion unit 404 implements digital to analog conversion to the target output gray scale data to acquire the target voltage of the target sub pixel dot, the adjusting sub unit 4051 will adjust the voltage of the target sub pixel dot to the target voltage, so that the controlling sub unit 4052 controls the liquid crystal molecules of the target sub pixel dot to be twisted to a target twist angle. Thereby, the light volume transmitting the liquid crystal molecules can be adjusted, and thus, the light ratio of the RGB three primary colors of the target pixel dot where the target sub pixel dot is can be changed. Accordingly, the executing sub unit 4053 changes the color displayed by the target pixel where the target sub pixel dot is. The color displayed by the target pixel dot is determined by the values of the lights transmitted from the three sub pixel dots of the target pixel dot. If the voltage of the target sub pixel dot is changed, the twist angle of the liquid crystal molecules of the target sub pixel dot will be changed. Thus, the light volumes of the lights transmitting through the liquid crystal molecules in the area covered by the target sub pixel dot is changed, and the color displayed by the target pixel dot changes. Thereby, the executing sub unit 4053 can control color display by the target pixel dot where the target sub pixel dot is to be the corresponding color of the target output gray scale data as displaying.

For example, supposing that the target sub pixel dot is G sub pixel dot, and if the color shift compensation device 400 directly employs the target input gray scale data 128 of the G sub pixel dot to be the target output gray scale data. Then, the target output gray scale data at this time point is 128, and the target voltage of the G sub pixel dot will be 0.50 Vref. Therefore, the color display by the target pixel dot where the G sub pixel is, and particularly the color display by the pixel dot of the middle area in the liquid crystal display panel might bias green in comparison with other pixel dots. If the target output gray scale data simultaneously corresponding to the target input gray scale data 128 and the previous output gray scale data 160 queried by the querying unit 403 from the target relationship table is 126. Then, the target voltage of the target sub pixel dot acquired by the digital to analog conversion unit 404 with digital to analog conversion is 0.49Vref. According to the target voltage, the adjusting unit 405 will adjust the twist angle of the liquid crystal molecules of the target sub pixel dot to the target twist angle corresponding to 0.49 Vref. Then, the color shift compensation device 400 can determine the volume of the green light corresponding to the G sub pixel dot transmitting the liquid crystal molecules in the area covered by the target sub pixel dot. The ratio of the G light in RGB of the target pixel dot where the G sub pixel dot is can be changed, and accordingly, the color displayed by the target pixel can be changed.

As being a possible embodiment, the adjusting sub unit 4051 can further execute the following operations:

judging whether the target voltage is larger than the present voltage of the target sub pixel dot;

as judging that the target voltage is larger than the present voltage of the target sub pixel dot, amplifying the present voltage of the target sub pixel dot to the target voltage;

as judging that the target voltage is smaller than the present voltage of the target sub pixel dot, diminishing the present voltage of the target sub pixel dot to the target voltage.

In the embodiment of the present invention, after the digital to analog conversion unit 404 implements digital to analog conversion to the target output gray scale data to acquire the target voltage of the target sub pixel dot, the adjusting sub unit 4051 in the adjusting unit 405 will judge the relationship of the target voltage and the present voltage of the target sub pixel dot, first. If the target voltage is larger than the present voltage of the target sub pixel dot, the adjusting sub unit 4051 will need to charge the target sub pixel dot to increase voltage of the target sub pixel dot to the target voltage. If the target voltage is smaller than the present voltage of the target sub pixel dot, the adjusting sub unit 4051 will need to discharge the target sub pixel dot to decrease voltage of the target sub pixel dot to the target voltage. If the target voltage and the present voltage of the target sub pixel dot are identical, the adjusting sub unit 4051 will keep the voltage of the target sub pixel dot.

In the embodiments of the present invention, the liquid crystal display panel is divided into a plurality of display areas, and each display area comprises a plurality of display lines aligned in row, and each display line comprises a plurality of pixel dots aligned in column, and each pixel dot comprises at least three sub pixel dots aligned in row. Therefore, as receiving target input gray scale data of a target sub pixel dot in a present line, the color shift compensation device acquires previous output gray scale data of a sub pixel dot of the previous line in the same display data line of the target sub pixel dot, and then, querying the target output gray scale data of the target sub pixel dot simultaneously corresponding to the target input gray scale data and the previous output gray scale data with combination of the target relationship table according to the target input gray scale data and the previous output gray scale data, and implementing digital to analog conversion to the target output gray scale data to acquire the target voltage of the target sub pixel dot, and ultimately, adjusting a color displayed by a target pixel corresponded with the target sub pixel dot according to the target voltage. In all display areas of the liquid crystal display panel, the target relationship table aiming at one display area is set. Because it needs register addresses for storing the target relationship table, the register addresses can be decreased and the production cost can be saved if there is only one target relationship table. With the embodiment of the present invention, the original voltage which should be applied to the target sub pixel can be adjusted to the voltage corresponding to the target output data for changing the color displayed by the target pixel where the target sub pixel dot is and accordingly, the color shift issue of the panel due to the impedance difference can be solved to promote the display effect.

It is understandable in practical to the person who is skilled in the art that all or portion of the processes in the method according to the aforesaid embodiment can be accomplished with the computer program to instruct the related hardwares. The program can be stored in a readable storage medium if the computer. As the program is executed, the processes of the embodiments in the aforesaid respective methods can be included. The storage medium can be a hardisk, an optical disc, a Read-Only Memory (ROM) or a Random Access Memory (RAM).

Above are embodiments of the present invention, which does not limit the scope of the present invention. Any equivalent amendments within the spirit and principles of the embodiment described above should be covered by the protected scope of the invention.

What is claimed is:

1. A color shift compensation device, applied in a liquid crystal display panel, wherein the liquid crystal display panel is divided into a plurality of display areas, which are arranged in parallel in a horizontal direction and each of the plurality of display areas comprises a plurality of display lines, which are in a horizontal direction and aligned line by line, and each of the plurality of display lines comprises a plurality of pixel dots aligned on the display line in a horizontal direction, and each of the plurality of pixel dots comprises at least three sub pixel dots aligned in a horizontal direction, and a scan circuit of the liquid crystal display panel controls a drive integrated circuit to sequentially input gray scale data to the sub pixel dots of the plurality of display lines in a predetermined direction, wherein, the color shift compensation device comprises:

an acquiring circuit, receiving target input gray scale data of a target sub pixel dot in a present line, and acquiring previous output gray scale data of a sub pixel dot of a previous line along the predetermined direction;

a querying circuit, querying target output gray scale data of the target sub pixel dot simultaneously corresponding to the target input gray scale data and the previous output gray scale data with combination of a target relationship table according to the target input gray scale data and the previous output gray scale data acquired by the acquiring circuit, wherein the target relationship table comprises corresponding relationships of input gray scale data of a sub pixel dot of the present line, output gray scale data of a sub pixel dot of the previous line adjacent to the sub pixel dot of the present line along the predetermined direction-and output gray scale data of the sub pixel dot of the present line for each of the plurality of display lines;

a digital to analog conversion circuit, implementing digital to analog conversion to the target output gray scale data queried by the querying circuit to acquire a target voltage of the target sub pixel dot;

an adjusting circuit, adjusting a color displayed by a target pixel where the target sub pixel dot is according to the target voltage acquired by the digital to analog conversion circuit;

wherein the adjusting circuit comprises an adjusting sub circuit, a controlling sub circuit and an executing sub circuit, wherein:

the adjusting sub circuit is employed for adjusting a voltage of the target sub pixel dot to the target voltage;

the controlling sub circuit is employed for twisting liquid crystal molecules of the target sub pixel dot to a target twist angle according to the target voltage acquired by the adjusting sub circuit;

the executing sub circuit is employed for adjusting a light intensity of the target sub pixel dot according to the target twist angle twisted by the controlling sub circuit to adjust a color displayed by a target pixel where the target sub pixel dot is;

wherein the color shift compensation device further comprises:

a judging circuit, judging whether the target input gray scale data and the previous output gray scale data are identical or not;

wherein as the target input gray scale data judged by the judging circuit and the previous output gray scale data are not identical, then the querying circuit is employed for querying the target output gray scale data of the target sub pixel dot simultaneously corresponding to the target input gray scale data and the previous output gray scale data with combination of the target relationship table according to the target input gray scale data and the previous output gray scale data.

2. The color shift compensation device according to claim 1, wherein the querying circuit comprises a selecting sub circuit, a querying sub circuit, an acquiring sub circuit and a determining sub circuit, wherein:

the selecting circuit is employed for selecting any one of the plurality of display areas of the liquid crystal display panel to be a target display area;

the querying sub circuit is employed for querying middle output gray scale data of the target sub pixel dot simultaneously corresponding to the target input gray scale data and the previous output gray scale data from the target relationship table according to the target input gray scale data and the previous output gray scale data, wherein the target relationship table comprises corresponding relationships of input gray scale data of sub pixel dot of the present line of the target display area, output gray scale data of the sub pixel dot of the previous line and output gray scale data of the sub pixel dot of the present line for each of the plurality of display lines in the target display area;

the acquiring sub circuit is employed for acquiring a relationship coefficient between the output gray scale data of the predetermined target display area and the output gray scale data of the display area where the target sub pixel dot is;

the determining sub circuit is employed for determining the target output gray scale data of the target sub pixel dot according to the middle output gray scale data queried by the querying sub circuit and the relationship coefficient acquired by the acquiring sub circuit.

3. The color shift compensation device according to claim 1, wherein the target relationship table comprises corresponding relationships of input gray scale data of sub pixel dot of the present line, output gray scale data of sub pixel dot of the previous line and output gray scale data of sub pixel dot of the present line for each of the plurality of display lines.

* * * * *